No. 664,140.
Patented Dec. 18, 1900.
W. D. FORSYTH.
BOILER TUBE CLEANER.
(Application filed Sept. 23, 1899.)
(No Model.)
2 Sheets—Sheet 1.
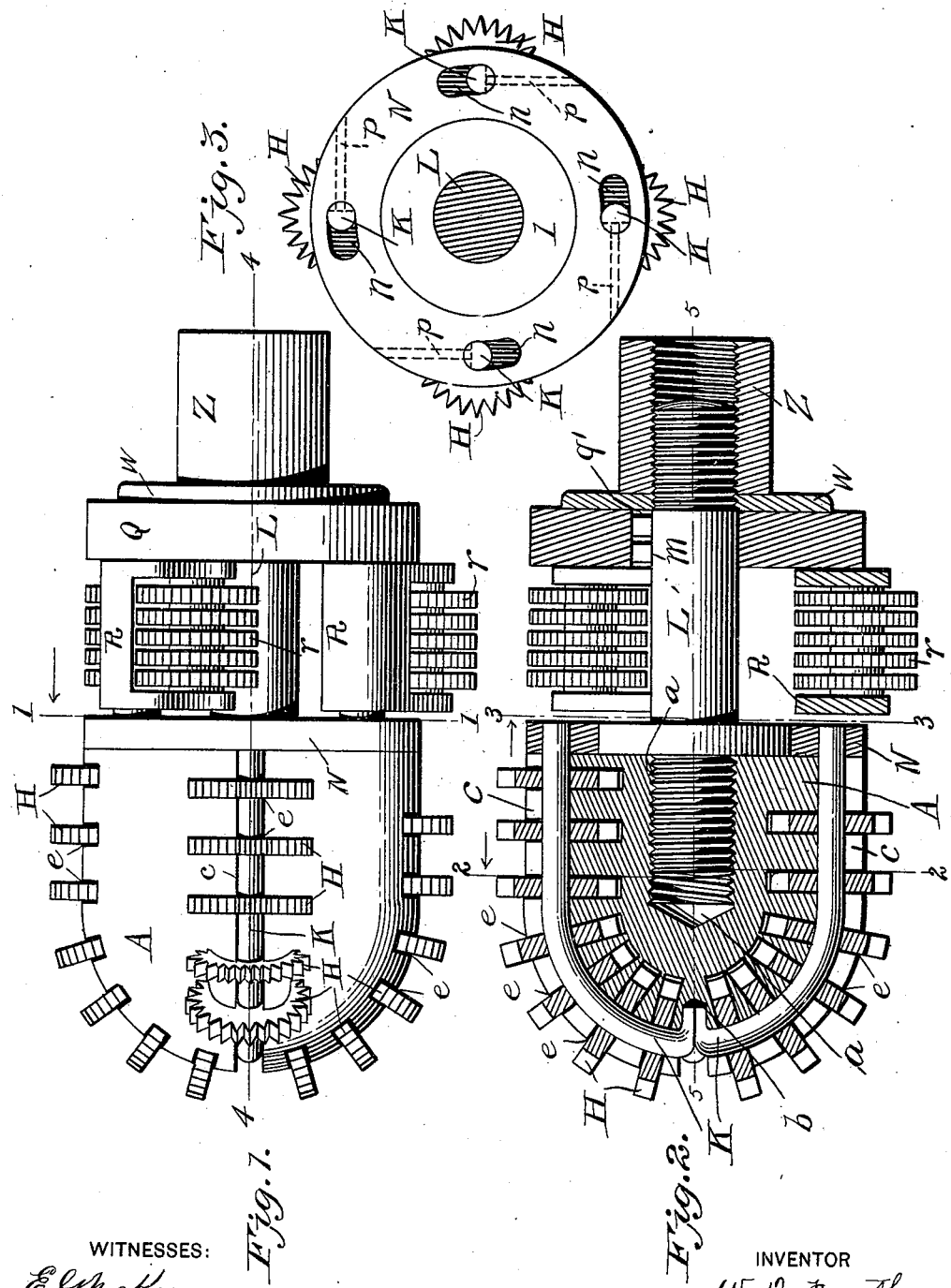
WITNESSES:
E. G. McKee.
G. M. Anderson
INVENTOR
W. D. Forsyth
BY
E. W. Anderson
his ATTORNEY.

No. 664,140. Patented Dec. 18, 1900.
W. D. FORSYTH.
BOILER TUBE CLEANER.
(Application filed Sept. 28, 1899.)
(No Model.) 2 Sheets—Sheet 2.
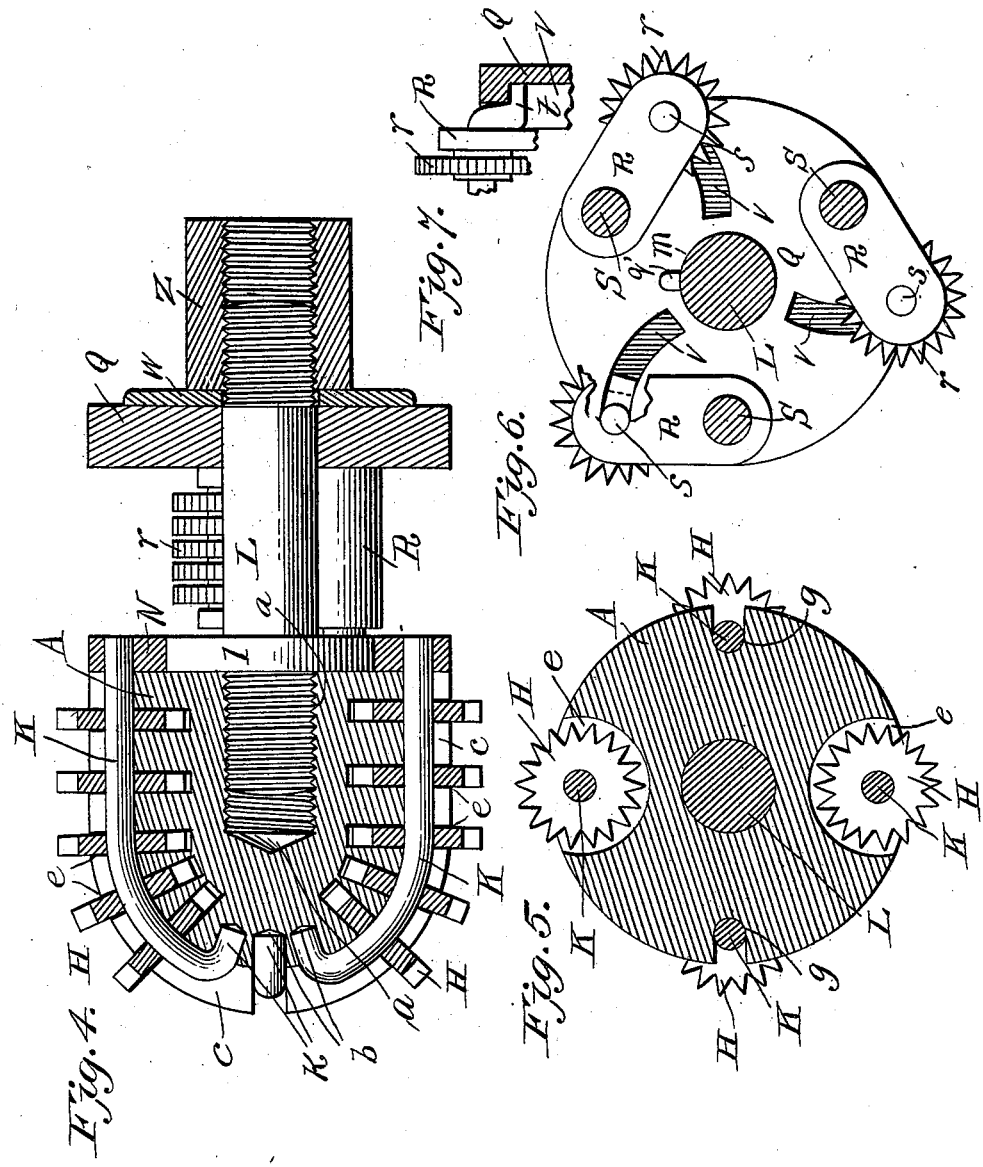
WITNESSES:
E. G. McKee.
G. M. Anderson
INVENTOR
W. D. Forsyth
BY
E. W. Anderson
his ATTORNEY.

UNITED STATES PATENT OFFICE.

WILBER DAVID FORSYTH, OF PITTSBURG, PENNSYLVANIA, ASSIGNOR TO THE UNION BOILER TUBE CLEANER COMPANY, OF SAME PLACE.

BOILER-TUBE CLEANER.

SPECIFICATION forming part of Letters Patent No. 664,140, dated December 18, 1900.

Application filed September 23, 1899. Serial No. 731,444. (No model.)

*To all whom it may concern:*

Be it known that I, WILBER DAVID FORSYTH, a citizen of the United States, and a resident of Pittsburg, in the county of Allegheny and State of Pennsylvania, have invented certain new and useful Improvements in Tube-Cleaners; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side elevation of the invention. Fig. 2 is a section on the line 4 4, Fig. 1. Fig. 3 is a section on the line 1 1, Fig. 1. Fig. 4 is a section on the line 5 5, Fig. 2. Fig. 5 is a section on the line 2 2, Fig. 2. Fig. 6 is a section on the line 3 3, Fig. 2. Fig. 7 is a detail view illustrating the engagement of the curved ends $t$ of pins $s$ with the slots $v$.

This invention has relation to tube-cleaners, which are more particularly designed for boiler and other tubes having hemispherical or concave ends; and the invention consists in the novel construction and combinations of parts, as hereinafter set forth.

In the accompanying drawings, illustrating this invention, the letter A designates a boss-form body having a hemispherical or convex end wall and cylindrical side walls merging into one another and which is provided in its base with a threaded seat $a$ and in its apex with one or more apertures $b$. Surface recesses $c$ extend longitudinally from the base to the apex or end of the convex portion of said body, where they intersect, and each of said recesses is intersected by a series of transverse surface seats or recesses $e$, alternating with ledges $g$, said series extending not only along the straight portion of the boss-form body, but also along the curved portion of the same, in which the plane bearings of the seats are radial. In these transverse seats, which have a radial relation to the head, are located and work the toothed cutting-rollers H, held in place by the curved journal-bars K, the hook ends $k$ of which engage the aperture or apertures $b$, above referred to, inwardly offset from the forward extremities of the recesses $c$. The seats $e$ are usually arranged in break-joint or staggered relation, so that the cutter-rollers therein will cover the surface of the work in an entire manner. The curved portions of the journal-bars K are parallel to the convex superficies of the cleaner-head, the rolling cutters upon said bars being at right angles to the convex superficies of the head and arranged to operate with their working faces substantially parallel to the hemispherical end walls of the tubes to be cleaned.

L represents a stem which is threaded at both ends and is provided with the circular flange I and the spline-stud $m$. This stem is screwed into the seat $a$ securely, its circular flange fitting against the base of the body A. On the stem and around the flange is placed the collar ledge-plate N, which is provided with short slots $n$ near its edge to receive the ends of the curved pivot-bars K, the rear ends of which are notched to receive the ends of the transverse locking-pins $p$ of the plate N.

Q indicates a heel plate or collar of the body, which is provided with the pivot-studs S, which serve to receive the swinging pivotal arms R, which carry the rear cleaning finishing-rollers $r$, the latter being mounted on the pins $s$, whose curved ends $t$ bear in and are offset inwardly in the direction of the curved slots $v$ of the plate Q, said slots having radial position, as indicated. The aperture $m'$ of the plate Q is offset at $q'$ to receive the spline-stud of the body-stem, and is thereby prevented from turning. A strong nut Z, which is screwed to the end of the stem in rear of a washer $w$, holds the parts securely together and provides for the attachment of the operating-shaft.

When this cleaning-head is rapidly turned in the tube, it is designed to rapidly clear out the scale and make its way home in the end of the tube, thoroughly cleaning out the hemispherical concave surface in a satisfactory manner.

Although a number of small cleaning-rollers are used in this head, it will be observed that they are connected in a strong and durable manner by means of the large pivot-bars, so that there is but little liability of fracture and consequent injury to the tube. Should, however, there be necessity to replace the cutters on account of wear or for other reasons, the parts are readily detachable, so that the repair can be made in a few minutes.

It will be noted that owing to the arched or convex arrangement of the rolling cutters said cutters on entering the tube to be cleaned will readily cut their way, owing to the fact that they project outwardly and forwardly from the cleaner-head and present their working faces at an angle to the scale, this forward projection and angular action increasing forwardly. At the same time when the hemispherical end of the tube is reached said cutters will thoroughly clean and polish it.

The rolling cutters are separated from each other longitudinally, whereby their sharp forward edges, formed by the intersection of the outer peripheral edges of their teeth with their lateral forward faces, have an effective action upon the scale, due to the forward and outward projection of said cutters from the cleaner-head.

Having described this invention, what I claim, and desire to secure by Letters Patent, is—

1. In a tube-cleaner, a cleaner-head, and longitudinally-separated toothed rolling cutters arranged upon said head in an arched or convex manner to project outwardly and forwardly therefrom and present their working faces at an increasing angle to the scale and substantially parallel to the convex or hemispherical end wall of the tube to be cleaned, substantially as specified.

2. In a tube-cleaner, a convex cleaner-head, having longitudinally-separated toothed rolling cutters arranged upon stationary axes and at right angles to the convex superficies of said head, to project outwardly and forwardly therefrom and present their working faces at an increasing angle to the scale, and substantially parallel to the convex or hemispherical end wall of the tube to be cleaned, substantially as specified.

3. In a tube-cleaner, a cleaner-head, and longitudinally-separated toothed rolling cutters arranged upon said head in an arched or convex manner to project outwardly and forwardly therefrom, and present their working faces at an increasing angle to the scale and substantially parallel to the convex or hemispherical end wall of the tube to be cleaned, together with finishing-cutters following said first-named cutters, substantially as specified.

4. In a tube-cleaner, a cleaner-head, and longitudinally-separated toothed rolling cutters arranged upon said head in an arched or convex manner to project forwardly and outwardly therefrom, and present their working faces at an increasing angle to the scale, and substantially parallel to the convex or hemispherical end wall of the tube to be cleaned, said cutters having a break-joint or staggered arrangement, substantially as specified.

5. In a tube-cleaner, the combination of a head having longitudinal surface recesses therein, and transverse surface recesses intersecting said longitudinal recesses, journal-bars seated in said longitudinal recesses, having transverse notches at their rear end portions, and a detachable connection with said head at their forward ends, rolling cutters upon said bars working in said transverse recesses, a stem secured to said head and extending rearwardly therefrom, a collar upon said stem, having elongated slots therein engaging the rear extremities of said bars, and pins carried by said collar, and engaging the transverse notches of said bars, substantially as specified.

6. In a tube-cleaner, the combination of a head having longitudinal surface recesses therein, and transverse surface recesses intersecting said longitudinal recesses, journal-bars seated in said longitudinal recesses, and having transverse notches at their rear end portions, and a detachable connection with said head at their forward ends, rolling cutters upon said bars working in said transverse recesses, a stem secured to said head and extending rearwardly therefrom, a collar upon said stem, having elongated slots therein engaging the rear extremities of said bars, pins carried by said collar, and engaging the transverse notches of said bars, a heel-plate fitted upon said stem to rotate therewith, a series of centrifugally-acting arms pivoted to said heel-plate, and working between said collar and heel-plate, rolling cutters carried by said arms, and a nut upon said stem to secure said heel-plate and arms in position, substantially as specified.

7. In a tube-cleaner the combination with the recessed body and its screw-stem, of the ledge and heel-plates, the curved journal-bars, and their cutting-rollers, the swinging arms and their cleaning-rollers, substantially as specified.

8. In a tube-cleaner, the combination with a rotating shaft, and a head carried thereby having arcuate slots, of cutter-carrying arms pivoted to said head, and rolling cutters upon said arms, the journal-pins of said cutters at their free end portions being offset inwardly in the direction of and engaging said slots to limit the outward movement of said cutters, substantially as specified.

9. In a tube-cleaner, the combination with a recessed head, of journal-bars having hook ends engaging seats of said head, and a detachable connection with said head at their opposite extremities and rolling cutters carried by said bars, substantially as specified.

10. In a tube-cleaner, the head having convex forward wall provided with longitudinal surface recesses therein, and with transverse surface recesses intersecting said longitudinal recesses, and having a radial relation to the convex superficies of said wall, journal-bars in said longitudinal recesses, and rolling cutters upon said bars, and working in said transverse recesses, substantially as specified.

11. In a tube-cleaner, the convex head having longitudinal surface recesses therein extending the entire length thereof and inwardly offset at their forward extremities, and with transverse surface recesses intersecting said longitudinal recesses and having a radial relation to the convex superficies of said head, detachable journal-bars in said longitudinal recesses and having hook ends engaging the inwardly-offset portions thereof, and rolling cutters upon said bars, and working in said transverse recesses, substantially as specified.

12. In a tube-cleaner, the head having a convex forward wall and cylindrical side walls merging into one another, and provided with longitudinal surface recesses therein, and with transverse surface recesses intersecting said longitudinal recesses and having a radial relation to the convex superficies of said forward and side walls, journal-bars in said longitudinal recesses, and rolling cutters upon said bars and working in said transverse recesses, substantially as specified.

In testimony whereof I affix my signature in presence of two witnesses.

WILBER DAVID FORSYTH.

Witnesses:
A. FRAZER LEGGATE,
JOHN E. BLACK.